(12) United States Patent
Roberts et al.

(10) Patent No.: US 7,245,582 B1
(45) Date of Patent: Jul. 17, 2007

(54) PROTECTION SWITCHING IN A MULTI-STAGE SWITCH FABRIC

(75) Inventors: Kim B. Roberts, Nepean (CA); Dino B. Fatica, Nepean (CA)

(73) Assignee: Nortel Networks Limited, St. Laurent, QC (CA)

( * ) Notice: Subject to any disclaimer, the term of this patent is extended or adjusted under 35 U.S.C. 154(b) by 861 days.

(21) Appl. No.: 09/875,154

(22) Filed: Jun. 7, 2001

(51) Int. Cl.
H04J 1/16 (2006.01)
H04J 14/00 (2006.01)

(52) U.S. Cl. .................. 370/217; 370/221; 370/225; 398/6

(58) Field of Classification Search ................ 370/388, 370/437, 216–228; 398/1–8
See application file for complete search history.

(56) References Cited

U.S. PATENT DOCUMENTS

| | | | |
|---|---|---|---|
| 2,275,606 A | 3/1942 | Ellinas et al. | |
| 5,436,886 A * | 7/1995 | McGill | 370/219 |
| 5,479,608 A | 12/1995 | Richardson | 395/182.02 |
| 6,052,373 A * | 4/2000 | Lau | 370/399 |
| 6,195,704 B1 * | 2/2001 | Suita | 709/239 |
| 6,335,992 B1 * | 1/2002 | Bala et al. | 385/17 |
| 6,567,576 B2 * | 5/2003 | MacDonald | 385/17 |
| 6,654,923 B1 * | 11/2003 | Grenier et al. | 714/752 |
| 6,771,908 B2 * | 8/2004 | Eijk et al. | 398/66 |
| 6,882,766 B1 * | 4/2005 | Corbalis et al. | 385/16 |
| 2002/0159681 A1 * | 10/2002 | MacDonald | 385/17 |

OTHER PUBLICATIONS

Ghaffar, A.et al., Middle stage requirements and blocking probability validation for three stage broadcasting Clos networks, Communications, 1996. ICC 96, 1996 IEEE International Conference on vol. 2, Jun. 23-27, 1996, pp. 1050-1054.*

* cited by examiner

Primary Examiner—Chi Pham
Assistant Examiner—Tri H. Phan
(74) Attorney, Agent, or Firm—Kent Daniels; Ogilvy Renault LLP (57) ABSTRACT

A network node includes a system enabling high-speed protection switching of traffic between respectively associated working and protection channels of a communications network. The node comprises a multi-stage switch fabric, an interface, and a toggle. The multi-stage switch fabric has a first stage including a respective plurality of stage-1 switch elements. The interface is operatively coupled to a set of one or more stage-1 switch elements, and is adapted to aggregate the working and protection channels of the communications network on a selected one of the set of stage-1 switch elements. Finally, the toggle is adapted to control the selected stage-1 switch element to map traffic between a middle stage of the switch fabric and a selected one of the working and protection channels.

31 Claims, 4 Drawing Sheets

PROTECTION SWITCHING IN A MULTI-STAGE SWITCH FABRIC

CROSS-REFERENCE TO RELATED APPLICATIONS

This is the first application filed for the present invention.

MICROFICHE APPENDIX

Not Applicable.

BACKGROUND OF THE INVENTION

Technical Field

The present invention relates to protection switching, and in particular to protection switching in a multi-stage switch fabric.

In the modern communications space, data communications networks are normally deployed on a physical layer network infrastructure constructed using network nodes interconnected by high-speed (frequency optical) data communications links. In most cases, the nodes and links are arranged in a ring architecture, such as a Bi-directional Line Switched Ring (BLSR), although mesh architectures are gaining popularity. The reliability of such communications networks is primarily a product of resource redundancy coupled with rapid physical fault detection and signal switching.

Resource redundancy refers to communications channel capacity that is held in a dormant (i.e., unused) state during normal operations of the network, so that it is available to carry traffic in the event of a network resource failure. In BLSR networks, a one-to-one ratio is typically maintained between working and protection channels. In mesh networks, the ratio of working-to-protection channels is typically much higher than 1:1. In all cases, at least one protection channel is provisioned for each link, so that upon detection of a network resource failure affecting a working channel of that link, traffic can be switched onto the protection channel to bypass the failed resource.

Resource failure detection and switching of traffic into the protection channel (commonly referred to as "protection switching") can normally be performed by any node of the network, and thus occurs in the nodes immediately adjacent the failed resource.

Typically, protection switching is accomplished by the switch fabric of the node. As is well known in the art, an N×N switch fabric operates to map traffic received through each one of N input ports to corresponding ones of N output ports. Some of these ports (on both the input and output sides of the switch fabric) are assigned to working channels, while others are assigned to protection channels. During normal operations of the network, traffic received by the node through a working channel (of an upstream link), is mapped through the switch fabric to an output port coupled to an appropriate working channel of a downstream link. When a network resource failure affecting the downstream link is detected, the received traffic is remapped through the switch fabric to another output port, which is coupled to a protection channel.

In general, the port assignments (e.g., as between working and protection channels) are arbitrary, so that working and protection channels can be accommodated by any of the input and output ports of the node. However, within the network, the protection channel is typically provisioned, and associated with one or more working channels. This avoids delays associated with dynamically locating and reserving protection channels following a network resource failure.

For example, a protection channel may be provisioned within a first link, and associated with a working channel in a second (physically diverse) link coupled to the same mode. Consequently, if the node detects a resource failure affecting the working channel, it can automatically switch the traffic out of the (failed) working channel and into the associated protection channel in order to restore communications. Because the protection channel is provisioned, it does not have to be dynamically allocated by the node as part of the failure handling procedure. Thus protection switching is accomplished by changing the output port assignment of the traffic, and the delay incurred is primarily a function of the time required to re-map the traffic through the switch fabric to the newly assigned output port.

While this arrangement is inexpensive and reliable (in that it exploits conventional functionality of the switch fabric), it suffers from the limitation that the traffic must be re-mapped through the switch fabric. As is known in the art, the time required to accomplish this operation tends to vary with the total amount of traffic being mapped through the switch fabric. Thus, as the total amount of traffic increases, the time required to re-map traffic flows (e.g., to provide protection switching and possibly re-balance resource allocation between traffic flows through the switch fabric) also increases, and may well result in unacceptably long protection switching delays. This effect is particularly noticeable in multi-layer (e.g., Clos) switch architectures, which are commonly used where robust (i.e., non-blocking) switching performance is required for high bandwidth traffic flows.

Canadian Patent Application No. 2,275,606, entitled "Automatic Protection Switching System in a Network", which was filed by Ellinas et al. on Dec. 20, 1996 and published on Jul. 2, 1998, teaches a system in which protection switching is performed by so-called protection switches within each node. The protection switches are independent of the switch fabric, and operate to selectively route traffic between provisioned working and protection channels of the network and the switch fabric. Thus, during normal operations of the network, traffic received through a working channel is routed by a protection switch into the switch fabric. However, when a network failure is detected, the protection switch operates to re-route the traffic directly into the provisioned protection channel, bypassing the switch fabric. Because the switch fabric is bypassed, the protection switching speed is not limited by the speed at which the traffic can be re-mapped through the switch fabric. However, a disadvantage of this arrangement is that the addition of protection switches and associated control systems dramatically increases the complexity and cost of each node.

An alternative technique of providing protection switching is to aggregate associated working and protection channels onto a single switch element of a multi-stage switch fabric, and then controlling the switch element to selectively map traffic between one of the channels and the middle layer of the switch fabric. Thus the working channel can be terminated at a port of a respective working port card, and the associated protection channel terminated at a port of a respective protection port card. The working and protection port cards are coupled to the selected switch element, so that traffic of both channels can be routed to the switch element.

This arrangement has the advantage that protection switching can be is performed at high speed, because traffic does not need to be re-mapped through the switch fabric.

Furthermore, because protection switching is performed within the switch fabric, complex (and expensive) external protection switches, such as those described in Canadian Patent Application No. 2,275,606, are not required. However, it suffers from the limitation that the working and protection channels must be coupled to a matched pair of (associated working and protection ) port card, and all of the traffic (of the associated working and protection channels) must be aggregated on a single switch element.

The use of matched pairs of port cards is satisfactory in networking environments in which a 1:1 ratio of working-to-protection channels is required. However, it lacks sufficient flexibility to enable higher (i.e., N:1) ratios of working-to-protection channels. Furthermore, each of the matched pair of port cards is provisioned to carry either one of working or protection traffic. As a result, approximately half of the port cards within a node may be idle at any one time, thereby dramatically increasing the cost of provisioning a node having a desired bandwidth capacity.

Aggregation of working and protection channels onto a single switch element requires that the involved switch element reserve resources for both channels, even where no traffic is flowing within a channel. This means that approximately half of the resources of the involved switch element will be idle at any one time. As a result, a larger switch fabric is required for a given bandwidth capacity of the node, thereby further increasing costs.

Accordingly, an economical system enabling high speed protection switching of high bandwidth traffic flows remains highly desirable.

SUMMARY OF THE INVENTION

An object of the preset invention is to provide an economical system enabling high speed protection switching of high bandwidth traffic flows.

Accordingly, an aspect of the present invention provides a system adapted to control protection switching in a node of a communications network. The node includes a multi-stage switch fabric having a first stage including a respective plurality of stage-1 switch elements. The system comprises an interface operatively coupled to a set of two or more stage-1 switch elements, and a toggle. The interface is adapted to convey traffic between a plurality of channels of the communications network and the set of stage-1 switch elements. The toggle is adapted to control the set of stage-1 switch elements to selectively map traffic between a middle stage of the switch fabric and a selected one of a set of any two of the plurality of channels.

Another aspect of the present invention provides a network node adapted to switch traffic between respectively associated working and protection channels of a communications network. The node comprises a multi-stage switch fabric, an interface, and a toggle. The multi-stage switch fabric includes a first stage including a respective plurality of stage-1 switch elements. The interface is operatively coupled to a set of two or more stage-1 switch elements, and is adapted to convey traffic between a plurality of channels of the communications network and the set of stage-1 switch elements. The toggle is adapted to control the set of stage-1 switch elements to selectively map traffic between a middle stage of the switch fabric and a selected one of a set of any two of the plurality of channels.

The first stage may be either one of: an input stage and an output stage of the multi-stage switch fabric. In some embodiments, the set of two or more stage-1 switch elements comprises less than all of the stage-1 switch elements of the multi-stage switch fabric.

The set of any two of the plurality of channels may include a working channel and a protection channel of the communications network. The protection channel may be provisioned and associated with the working channel in accordance with a design of the communications network. Alternatively, the protection channel may be dynamically allocated (e.g., from among the channels coupled to the interface) in response to detection of a network resource failure affecting traffic flow through the working channel.

In preferred embodiments, the interface includes a group, or quadrant, at least two port cards, each of which operates to convey traffic between at least two respective channels of the communications network and the set of stage-1 switch elements. Preferably, traffic is conveyed between each of the working and protection channels, and the set of stage-1 switch elements, by respective first and second port cards of the interface.

In some embodiments, two or more interfaces may be operatively coupled to respective sets of stage-1 switch elements. In such cases, the respective sets of stage-1 switch elements are preferably non-overlapping. Still more preferably, a number of stage-1 switch elements within each set is the same. In general, the number of sets of stage-1 switch elements, and the maximum number of switch elements within each set, are arbitrary. Increasing the number of switch elements within each set tends to improve non-blocking performance of the switch fabric, but at a cost of increased track length (and thus propagation delays).

In some embodiments, the multi-layer switch fabric comprises a plurality of parallel switch cards having a respective plurality of layer-1 switch elements. In such cases, the set of layer-1 switch elements may include a respective set of corresponding layer-1 switch elements of each one of the parallel switch cards.

In some embodiments, the toggle comprises: a pointer and a controller. The pointer may have respective working and protection states corresponding to each one of the working channel and the protection channel. The set of stage-1 switch elements is responsive to the pointer to map traffic between the middle stage of the switch fabric and one of the working channel and the protection channel in accordance with the state of the pointer. The controller operates to select the state of the pointer, preferably in accordance with an operation state of the communications network.

For example, the controller may be adapted to select the protection state of the pointer when a network resource failure affecting the working channel is detected, such that traffic is mapped between the middle stage of the switch fabric and the protection channel. During normal operations of the network, the controller operates to select (or maintain) the working state of the pointer such that traffic is mapped between the middle stage of the switch fabric and the working channel.

Thus the present invention provides a an economical system that is capable of providing high-speed protection switching, and a network node that incorporates the system. The node includes a multi-stage (e.g., Clos) switch fabric that operates in a conventional manner to map traffic between input and output stages of the switch fabric. Each of these input and output stages is coupled to the communications network via respective interfaces, which convey traffic between a respective plurality of channels and a respective set of two or more switch elements. As a result, protection switching is accomplished entirely within the involved set(s) of switch elements of the input and/or output stages of the switch fabric, without re-mapping the traffic through the switch fabric itself. This switching function can be accomplished by toggling a sate of a pointer within the involved switch elements, and thus can be performed at very high speed. Because the protection switching function is accomplished within the set of stage-1 switch elements, the working and protection channels can be any two of the plurality of channels hosted by the interface. As a result, a high level of flexibility in selection of protection channels is possible, including an N:1 protection ratio, and/or dynamic allocation of the protection channel. Thus the system and node of the present invention can be deployed in both BLSR and mesh network architectures.

BRIEF DESCRIPTION OF THE DRAWINGS

Further features and advantages of the present invention will become apparent from the following detailed description, taken in combination with the appended drawings, in which:

FIG. 1 is a block diagram schematically illustrating principle elements of an exemplary BLSR communications network in which the present invention may be deployed;

It will be noted that throughout the appended drawings, like features are identified by like reference numerals.

DETAILED DESCRIPTION OF THE PREFERRED EMBODIMENT

In the following description and the appended drawings, the present invention is described by way of a preferred embodiment deployed in a bi-directional Line Switched Ring (BLSR) communications network. However, those skilled in the art will appreciate that the present invention may be usefully deployed in any communications network architecture (including, for example, mesh networks) in which working and protection channels are provisioned. Thus it will be understood that the present invention is not limited to any particular network architecture.

The present invention provides an efficient system that enables high speed protection switching in a communications network having provisioned working and protection channels. FIG. 1 is a block diagram showing an exemplary communications network in which the present invention may be deployed.

As shown in FIG. 1, the network 2 has A BLSR architecture, and comprises a plurality of nodes 4 interconnected by optical fiber links 6, each of which is provisioned with a working channel 8 and a protection channel 10. It will be seen that the network 2 of FIG. 1 is composed of a pair of adjacent rings, which share nodes 4c and 4f and link 6c. This arrangement enables communications paths to be mapped across both rings (through either of nodes 4c and 4f) as is well known in the art. In the illustrated embodiment, the working and protection channels 8, 10 are provisioned in a 1:1 ratio in each link 6. However, it will be appreciated that other ratios of working-to-protection channels may be utilized. Similarly, the protection channel 10c in link 6c may be shared by the two adjacent rings, thereby enabling a further improvement in the utilization efficiency of that link 6. In any event, in a BLSR network, working channel traffic is conveyed in a single direction in all links of a ring, and protection channel traffic is conveyed in the opposite direction. This arrangement is illustrated in FIG. 1, by the arrows indicating the respective directions of working and protection channel traffic of each link 6.

Figure 2:
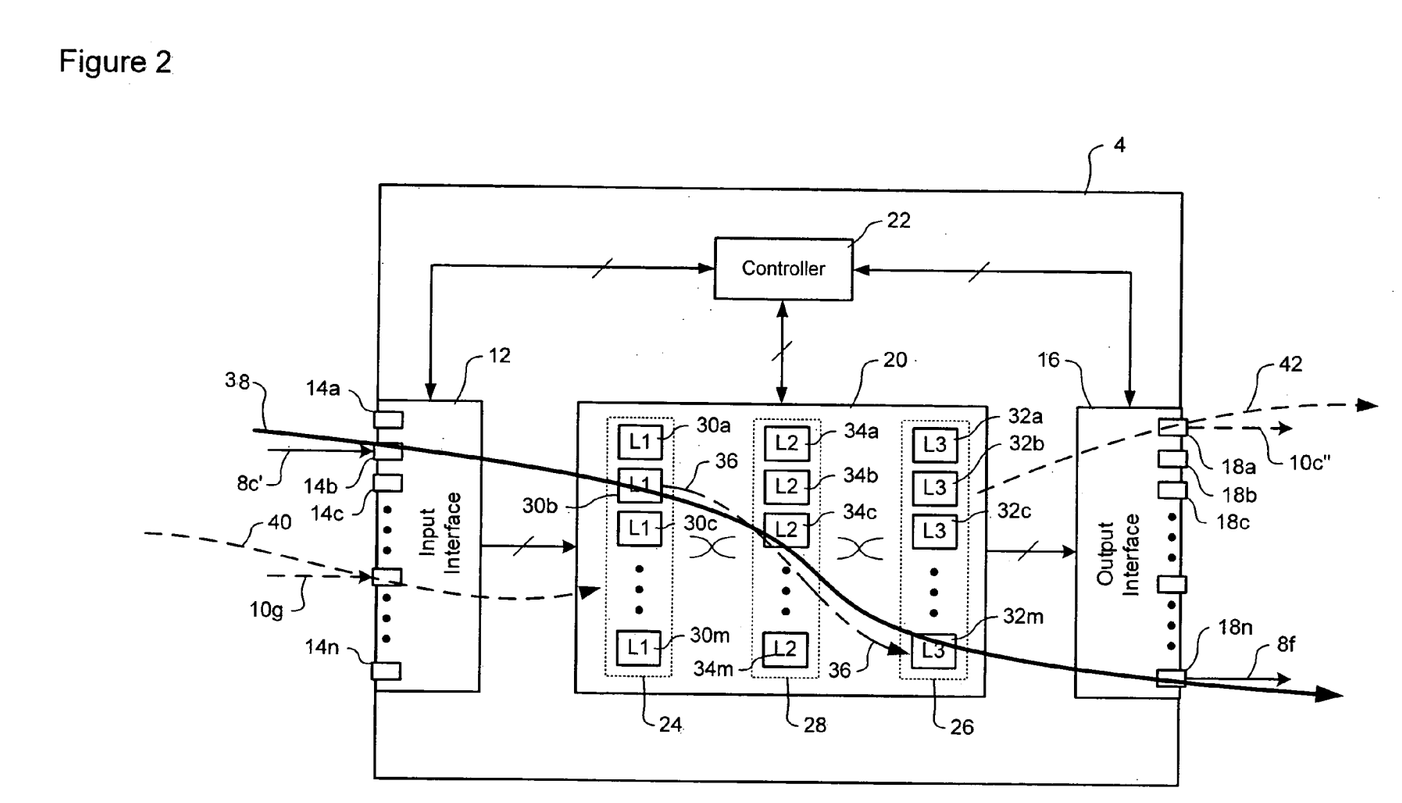
FIG. 2 is a block diagram schematically illustrating principle elements of a conventional network node.

As shown in FIG. 2, each node 4 of the network 2 comprises an input interface 12 including a plurality of input ports 14 for receiving incoming traffic through respective upstream channels of the network 2; an output interface 16 including a plurality of output ports 18 for launching outgoing traffic into respective downstream channels of the network 2; and N×N switch fabric 20 designed to map traffic received through each one of N input ports 14 to any one of the N output ports 18, and a controller 22 for controlling operation of the node 4. In general, the port assignments (e.g., as between working and protection channel) are arbitrary, so that working and protection channels can be accommodated by any of the input and output ports 14, 18 of the node 4, without significantly affecting switching performance.

The switch fabric 20 may, for example, be provided as a conventional multi-stage (i.e., Clos-type) switch network comprising input and output stages 24, 26 separated by a middle stage 28. As is known in the art, each stage includes a plurality of parallel (normally inherently non-blocking) switch elements, each of which is interconnected with switch elements of adjacent stages. Thus each input stage switch element 30 is interconnected with two or more (ideally all) middle stage switch elements 34, each of which, in turn, is interconnected with two or more (ideally all) output stage switch elements 32. During set-up of the communications path traversing the node 4, the switch fabric 20 is controlled, in a known manner, to map an intra-switch path 36 through the middle stage 28 between a pair of input and output stage switch elements 30, 32. The involved input stage switch element 30 is then controlled to route traffic received through an input port 14 to the intra-switch path 36. Similarly, the involved output stage switch element 32 is controlled to route traffic received through the intra-switch path 36 to an output port 18.

For the purpose of illustrating operation of the present invention, conventional protection switching is described below with respect to FIGS. 1 and 2. Protection switching in accordance with the present invention will then be described with reference to FIGS. 3 and 4.

Referring to FIG. 1, an exemplary unidirectional communications path 38 is mapped between an ingress node 4a and an egress node 4e of the network 2. Following conventional BLSR mapping techniques, the path 38 will be mapped through the working channel 8 of the network, traversing nodes 4b, 4c and 4f, and links 6a–c and 6f. As shown in FIG. 2, the path 38 will be mapped through node 4f between working channel 8c' in (upstream) link 6c, and corresponding working channel 8f in (downstream) link 6f. Thus an intra-switch path 36 is mapped through the switch fabric 20 between input stage switch element 30b and output stage switch element 32m. The input stage switch element 30b is then controlled to route traffic received through input port 146 connected to working channel 8c' to the intra-switch path 36. Similarly, output stage switch element 32m is controlled to route traffic received through the intra-switch path 36 to output port 18n connected to working channel 8f.

As is well known in the art, if a network resource failure affecting a working channel 8 traversed by the path 38 is detected, the traffic within the path 38 will be switched into protection channel 10 to bypass the failed resource, and thereby restore communication through the path 38. Thus, if a failure of any one of nodes 4b and 4c and/or links 6a–c is detected, traffic will be switched (e.g., by node 4a) into a protection path 40 mapped through protection channel 10 between nodes 4a and 4f (traversing node 4g and links 6g–h) as shown in FIG. 1. As shown in FIG. 2, this will result in traffic being received by node 4f through protection channel 10g of link 6g, and this traffic will be mapped through the switch fabric 20 to output port 18n connected to the working channel 8f of link 6f to restore communications through the path 38.

Similarly, if a failure of link 6f is detected, then node 4f will re-map traffic of the path 38 (received, for example, through input port 14b connected to the working channel 8c') through the switch fabric 20 and into a protection path 42 mapped through protection channel 10c" between nodes 4f and 4e (traversing nodes 4c–d and links 6c–e) as shown in FIG. 1. Node 4e will then operate normally to switch the traffic received through the protection channel 10e into working channel to restore communications through the path 38.

As may be seen in the above examples, provisioned working and protection channels 8, 10 are associated with one another, based on the design of the network 2 and installation of each node 4. Thus, in the example of FIGS. 1 and 2, working channel 8c is associated with protection channel 10g at node 4f, in that a network resource failure affecting traffic flow through working channel 8c will result in node 4f receiving the traffic through the protection channel 10g. Similarly, working channel 8f is associated with protection channel 10c at node 4f, in that a network failure affecting traffic flow through working channel 8f will result in node 4f re-routing the traffic to the protection channel 10c.

With this arrangement, protection switching is performed by the switch fabric 20, by re-mapping traffic flows between appropriate ones of the input and output ports 14, 18 in a manner known in the art. However, as described above, this means that the protection switching performance of the node 4 will be a function of the speed at which traffic can be re-mapped through the switch fabric 20. Where the switch fabric is a multi-stage switch network as shown in FIG. 2, this performance will typically be an inverse function of the utilization efficiency of the switch fabric capacity, and thus will tend to degrade as traffic within the network 2 increases.

Figure 3:
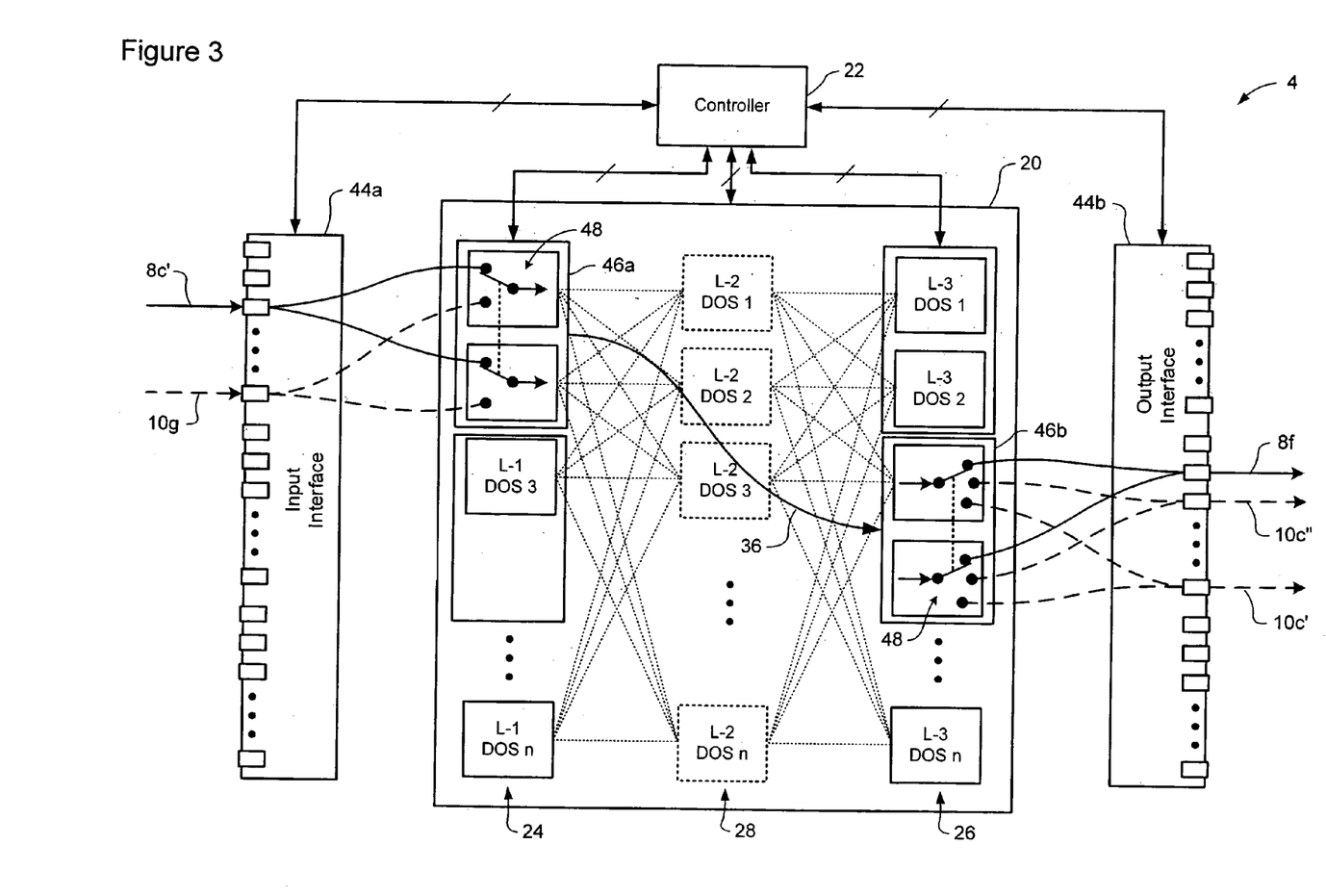
FIG. 3 is a block diagram schematically illustrating operation of a network node in accordance with an embodiment of the present invention.
Figure 4:
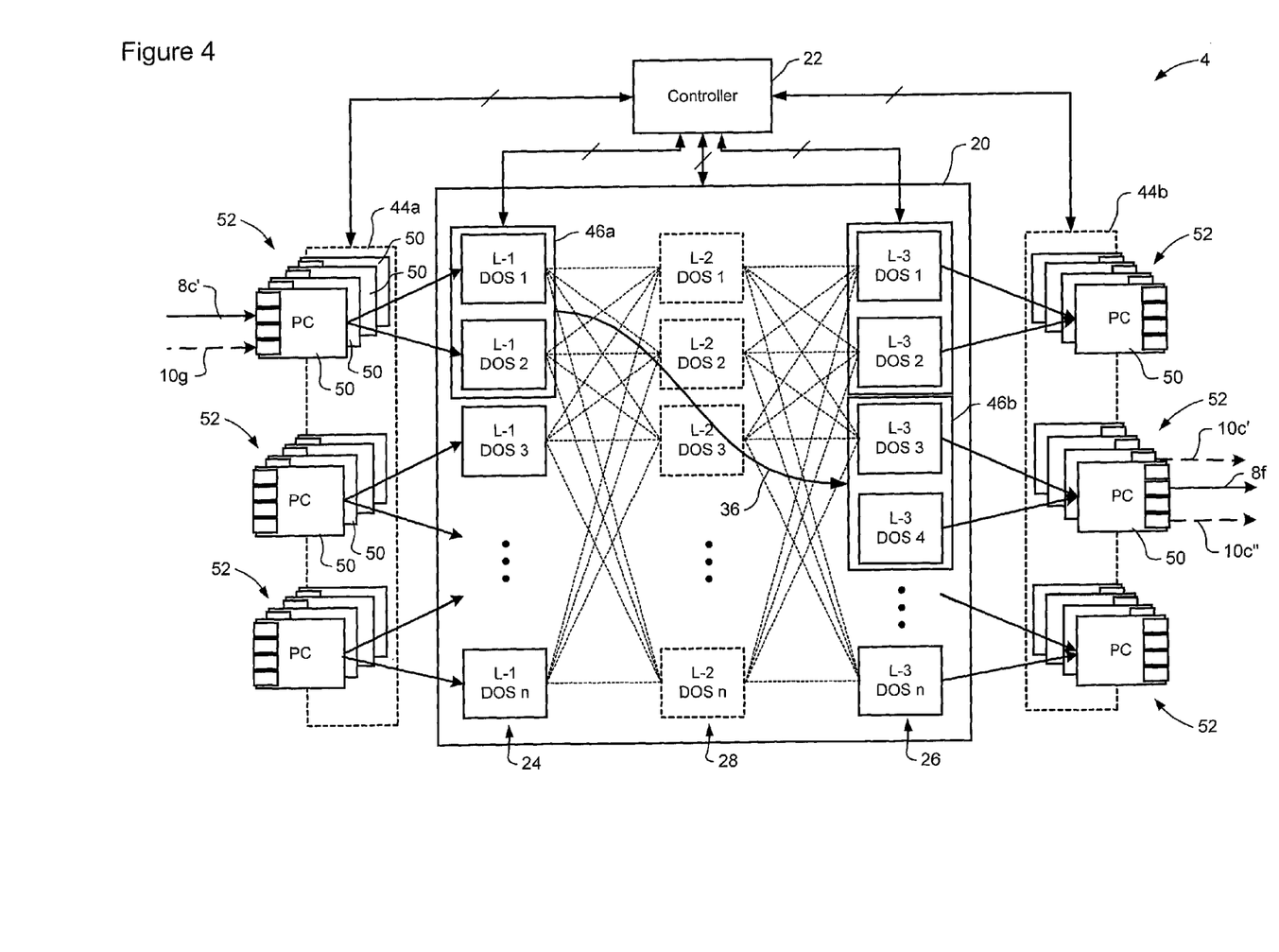
FIG. 4 is a block diagram schematically illustrating principle elements of an interface usable in the embodiment of FIG. 3.

The present invention provides a cost-effective system that enables high-speed protection switching, without re-mapping the traffic through the switch fabric 20. FIGS. 3 and 4 are block diagrams schematically illustrating principle elements and functionality of a protection switching system in accordance with an exemplary embodiment of the present invention.

As shown in FIG. 3, the protection switching system of the present invention generally comprises an interface 44 designed to aggregate a plurality of channels in a set 46 of two or more switch elements of a multi-stage switch fabric; and a toggle 48 capable of controlling the involved set 46 of switch elements to selectively route traffic between a selected one of a set of any two of the channels (e.g., the working and protection channels 8, 10) and an intra-switch path 36 mapped through and the switch fabric 20.

By way of example, FIG. 3 illustrates aggregation of channels 8, 10 within, and mapping of communications path 38 through, node 4f of the network 2 (see FIG. 1) in accordance with the present invention. As shown in FIG. 3, each of the input and output stages 24, 26 of the multi-stage switch fabric 20 are divided into predetermined sets 46, each of which includes two or more switch elements 30, 32, that are controlled (e.g., by the controller 22) to cooperate to map traffic between a respective interface 44 and the middle stage 28 of the switch fabric 20. The interface 44 comprises a respective plurality of ports 14, 18 connected to respective channels 8, 10 of the communications network 2, and is provisioned to aggregate all of the channels 8, 10 onto the respective set 46 of switch elements.

Thus, in the example of FIG. 3, an input interface 44a is provisioned (e.g., during installation of the node 4f) to aggregate a plurality of channels (including working channel 8c' and its associated protection channel 10g) into a set 46a of input stage switch elements 30. Similarly, an output interface 44b is provisioned (e.g., during installation of the node 4f) to aggregate a plurality of channels, including working channel 8f and its associated protection channel 10c, into a set 46b of output stage switch elements 32. In this respect, it will be noted that (as shown in FIG. 1), link 6c includes two alternate protection channels (10c' and 10c"), either of which may be used to carry protection path 42. Thus in the embodiment of FIG. 3, both protection channels 10c' and 10c" are coupled to ports of the output interface 44b, and aggregated, along with working channel 8f, into a common set 46b of output stage switch elements 32.

As may be appreciated, various techniques may be used to aggregate channels within respective sets of switch elements, and subsequently map traffic to intra-switch path 36 mapped through and the switch fabric 20. For example, the interface maybe controlled (in a known manner) to aggregate the involved channels onto a single switch element within the set, and then intra-switch path 36 mapped from this switch element. Alternatively, the interface may be controlled to distribute the channels across the set of switch elements (e.g., by traffic of working channel 8c' and protection channel 10g to respective different switch elements within the set). In this case, the intra-switch path 36 may comprise respective intra-switch paths (not shown) mapped through the switch fabric from each of the involved switch elements within the set. Other techniques may be utilized without departing from the intended scope of the present invention.

In either case, communications path 38 is mapped through the node 4f by establishing an intra-switch path 36 between the involved input and output stage switch element sets 46a and 46b. Subsequently, protection switching (to accommodate traffic received through protection path 40, and/or to switch traffic into protection path 42) can be accomplished by suitably controlling the state of the toggles 48 in the involved input and output stage switch element sets 46a and 46b. As may be seen in FIG. 3, this protection switching operation takes place entirely within the involved input and output stage switch element sets 46a and 46b, and thus does not affect the intra-switch path 36. Consequently, the protection switching performance (i.e., speed) of the present invention is not limited by delays incurred to re-map traffic through the switch fabric 20.

Various means may be used to implement the toggle 48 in each of the input and output stage switch element sets 46a and 46b. For example, in a conventional multi-stage network, each input (and output) stage switch element is designed to terminate a predetermined maximum number of intra-switch paths 36, and can be controlled to route traffic between any of these paths and any one of a plurality of ports 14, 18. Thus a respective toggle record (not shown) may be defined (e.g., by the controller 22) for each intra-switch path 36 terminated by a switch element 30, 32 (or a set 46 of switch elements). A pointer (not shown) to a selected port can be defined as part of the toggle record. Using this arrangement, protection switching can be performed by changing the state of the pointer to point to a port hosting a selected one of the working and associated protection channels. Alteratively, the toggle record may be defined having respective pointers to the ports connected to the working and protection channels, and a control field adapted to identify an "active" one of the pointers. In this case, protection switching can be accomplished by changing the state of the control field. In either case, the use of toggle records enables high-speed protection switching without re-mapping the intra-switch path 36 through the switch fabric 20.

As may be seen in FIGS. 1 and 3, simple toggling between a single working channel 8 and an associated single protection channel 10 can be accomplished using a 2:1 toggle 48a (e.g., in respect of input switch element set 46a) capable of controlling each switch element 30 within the set 46a to route traffic between a selected one of two ports and intra-switch path 36. The use of a 3:1 toggle 48b (e.g., in respect of the output switch element set 46b) enables the involved switch elements to route traffic between a selected one of three ports and intra-switch path 36. Thus, in the example of FIGS. 1 and 3, if a failure affecting working channel 8f is detected, the protection path 42 can be mapped through either one of protection channels 10c' or 10c", and the toggle 48b set to control the output switch element set 46b to route the traffic to the output port 18 hosting the appropriate one of the protection channels 10.

A 2:1 toggle 48 will normally enable efficient protection switching in a BLSR network environment with a 1:1 ratio of working to protection channels. Increasing the number of ports to which a toggle 48 can point produces an accompanying increase in flexibility in the selection of protection paths, and working to protection channel ratios. IN general, an N:1 toggle 48 may be defined for each set 46 of switch elements. The value of N may be selected to provide a desired degree of flexibility in the selection of protection paths, and/or an N:1 ratio of working to protection channels. In cases where multiple protection channels are available, selection of one of the protection channels may be conducted dynamically (following detection of a network resource failure) by the controller 22, in accordance with a suitable algorithm.

Those skilled in the art will be able to identify further alternative methods of controlling the involved sets 46 of input and output switch elements 30, 32 to toggle between channels, without departing from the intended scope of the present invention.

As may be appreciated, the interfaces 44 may be implemented in various ways to aggregate the channels onto a set 46 of switch elements. Typically, an interface 44 is implemented as a plurality of port cards 50 (see FIG. 4), each of which includes a number of ports (e.g., four ports per port card) and is designed to route traffic between each of the ports and the switch fabric 20. As is known in the art, maximum non-blocking performance can be achieved by coupling each port card 50 to every input and/or output stage switch element 30, 32 of the switch fabric 20. The degree of overlap between the switch elements 30, 32 to which each port card 50 is coupled is thus maximized, which facilitates load balancing within the switch fabric 20. This means that any two port cards 50 will be coupled to each switch element 30, 32, and thus it is possible to aggregate working and associated protection channels onto a selected set of two or more switch elements 30, 32 by coupling the working and protection channels to respective ports 14, 18, and controlling the involved port card(s) 50 to route traffic between these ports 14, 18 and the switch elements 30, 32 within the set 46.

As may be seen in FIG. 4, this aggregation of channels using one or more port cards 50 may be simplified by dividing the port cards 50 into groups 52, or quadrants, comprising a predetermined number of port cards 50, all of which are coupled to a corresponding set 46 of switch elements 30, 32. In the illustrated embodiment, each quadrant 52 comprises four port cards 50, each of which is connected to a common set 46 of two switch elements 30, 32. It will be appreciated that each quadrant 52 may include more or fewer port cards 50, and the corresponding set 46 of switch elements may include more than two switch elements 30, 32, if desired. As shown in FIG. 4, the set 46 of switch elements coupled to any one quadrant 52 does not overlap with the corresponding set 46 of switch elements coupled to any other quadrant 52.

With this arrangement, each channel hosted by any of the port cards 50 within a quadrant 52 is inherently aggregated onto the corresponding set 46 of switch elements 30, 32. Controlling the port cards 50 within the quadrant 52 to route traffic to a selected one or more switch elements 30, 32 within the set 46 is thus proportionately simplified. Thus, aggregation of working and associated protection channels 8, 10 is readily accomplished, provided that the working and protection channels 8, 10 are coupled to ports 14, 18 hosted by any of the port cards 50 within any one quadrant 52.

If desired, load balancing within the switch fabric 20 can be improved by dividing the switch fabric 20 into a plurality of parallel switch cards (not shown), and then connecting the port cards 50 orthogonally across the parallel switch cards, so that the port cards 50 of each quadrant 52 are connected to a common set 46 of switch elements 30, 32 on each of the parallel switch cards.

Thus it will be seen that the present invention provides a an economical system that is capable of providing high-speed protection switching, and a network node that incorporates the system. The node includes a multi-stage (e.g., Clos) switch fabric that operates in a conventional manner to map traffic between input and output stages of the switch fabric. Each of these input and output stages is coupled to the communications network via respective interfaces, which aggregate associated working and protection channels on a single switch element. As a result, protection switching can be accomplished entirely within the involved switch element(s) of the input and/or output stages of the switch fabric, without re-mapping the traffic through the switch fabric itself.

The embodiment(s) of the invention described above is (are) intended to be exemplary only. The scope of the invention is therefore intended to be limited solely by the scope of the appended claims.

We claim:

1. A system for controlling protection switching in a node of a communications network, the node comprising a multi-stage switch fabric having a first stage including a respective plurality of stage-1 switch elements, the system comprising:

an interface operatively coupled to a set of two or more stage-1 switch elements, the interface aggregating a plurality of channels of the communications network into the set of stage-1 switch elements; and a toggle for controlling the set of stage-1 switch elements to selectively map traffic between an intra-switch path mapped through the multi-stage switch fabric and a selected one of a set of any two of the plurality of channels.

2. A system as claimed in claim 1, wherein the first stage comprises one of:
an input stage and an output stage of the multi-stage switch fabric.

3. A system as claimed in claim 1, wherein the set of two or more stage-1 switch elements comprises less than all of the stage-1 switch elements of the multi-stage switch fabric.

4. A system as claimed in claim 1, wherein the set of any two of the plurality of channels comprises a working channel and a protection channel of the communications network.

5. A system as claimed in claim 4, wherein the protection channel is provisioned and associated with the working channel in accordance with a design of the communications network.

6. A system as claimed in claim 4, wherein the protection channel is dynamically allocated in response to detection of a network resource failure affecting traffic flow through the working channel.

7. A system as claimed in claim 4, wherein the interface comprises at least two port cards, each port card conveying traffic between at least two respective channels of the communications network and the set of stage-1 switch elements.

8. A system as claimed in claim 7, wherein traffic is conveyed between each of the working and protection channels, and the set of stage-1 switch elements, by respective first and second port cards of the interface.

9. A system as claimed in claim 7, wherein the multi-stage switch fabric comprises a plurality of parallel switch cards having a respective plurality of stage-1 switch elements.

10. A system as claimed in claim 9, wherein the set of stage-1 switch elements comprises a corresponding set of two or more stage-1 switch elements of each one of the plurality of parallel switch cards.

11. A system as claimed in claim 4, wherein the toggle comprises:
a pointer having respective working and protection states corresponding to each one of the working channel and the protection channel, the set of stage-1 switch elements mapping traffic between the middle stage of the switch fabric and one of the working channel and the protection channel in accordance with the state of the pointer; and
a controller for selecting a state of the pointer.

12. A system as claimed in claim 11, wherein the controller is operative to:
select the protection state of the pointer such that traffic is mapped between the middle stage of the switch fabric and the protection channel, when a network resource failure affecting the working channel is detected; and
select the working state of the pointer such that traffic is mapped between the middle stage of the switch fabric and the working channel, otherwise.

13. A system as claimed in claim 1, wherein two or more interfaces are operatively coupled to respective sets of stage-1 switch elements.

14. A system as claimed in claim 13, wherein the respective sets of stage-1 switch elements are not overlapping.

15. A system as claimed in claim 14, wherein a number of stage-1 switch elements within each set is the same.

16. A network node for switching traffic between associated working and protection channels of a communications network, the node comprising:
a multi-stage switch fabric comprising a first stage including a respective plurality of stage-1 switch elements;
an interface operative coupled to a set of two or more stage-1 switch elements, the interface aggregating a plurality of channels of the communications network into the set of stage-1 switch elements; and
a toggle for controlling the set of stage-1 switch elements to selectively map traffic between an intra-switch path mapped through the multi-stage switch fabric and a selected one of a set of any two of the plurality of channels.

17. A node as claimed in claim 16, wherein the first stage comprises one of: an input stage and an output stage of the multi-stage switch fabric.

18. A node as claimed in claim 16, wherein the set of two or more stage-1 switch elements comprises less than all of the stage-1 switch elements of the multi-stage switch fabric.

19. A node as claimed in claim 16, wherein the set of any two of the plurality of channels comprises a working channel and a protection channel of the communications network.

20. A node as claimed in claim 19, wherein the protection channel is provisioned and associated with the working channel in accordance with a design of the communications network.

21. A node as claimed in claim 19, wherein the protection channel is dynamically allocated in response to detection of a network resource failure affecting traffic flow through the working channel.

22. A node as claimed in claim 19, wherein the interface comprises at least two port cards, each port card conveying traffic between at least two respective channels of the communications network and the set of stage-1 switch elements.

23. A node as claimed in claim 22, wherein traffic is conveyed between each of the working and protection channels, and the set of stage-1 switch elements, by respective first and second port cards of the interface.

24. A node as claimed in claim 16, wherein the toggle comprises:
a pointer having respective working and protection stages corresponding to each one of the working channel and the protection channel, the set of stage-1 switch elements mapping traffic between the middle stage of the switch fabric and one of the working channel and the protection channel in accordance with the state of the pointer; and
a controller for selecting a state of the pointer.

25. A node as claimed in claim 24, wherein the controller is operative to:
selected the protection state of the pointer such that traffic is mapped between the middle stage of the switch fabric and the protection channel, when a network resource failure affecting the working channel is detected; and
select the working state of the pointer such that traffic is mapped between the middle stage of the switch fabric and the working channel, otherwise.

26. A node as claimed in claim 16, wherein two or more interfaces are operatively coupled to respective sets of stage-1 switch elements.

27. A node as claimed in claim 26, wherein the respective sets of stage-1 switch elements are non-overlapping.

28. A node as claimed in claim 27, wherein a number of stage-1 switch elements within each set is the same.

29. A node as claimed in claim 16, wherein the multi-stage switch fabric comprises a plurality of parallel switch cards having a respective plurality of stage-1 switch elements.

30. A node as claimed in claim 29, wherein the set of stage-1 switch elements comprises a corresponding set of stage-1 switch elements of each one of the plurality of parallel switch cards.

31. A node as claimed in claim 30, wherein the selected stage-1 switch element comprises a corresponding one switch element of each one of the plurality of parallel switch cards.

* * * * *